United States Patent [19]

Jourdan

[11] 4,120,318
[45] Oct. 17, 1978

[54] DAMPENING MEANS FOR SWING CHECK VALVE

[75] Inventor: Jerry W. Jourdan, Alvin, Tex.

[73] Assignee: ACF Industries, Incorporated, New York, N.Y.

[21] Appl. No.: 832,485

[22] Filed: Sep. 12, 1977

[51] Int. Cl.² .......................................... F16K 15/03
[52] U.S. Cl. ................. 137/527.4; 251/298; 251/87
[58] Field of Search .............. 137/527, 527.4; 251/87, 251/298

[56] References Cited

U.S. PATENT DOCUMENTS

| 1,156,326 | 10/1915 | Stiers .................................. 251/298 |
| 2,496,898 | 2/1950 | Thompson ........................ 137/527.4 |
| 3,016,914 | 1/1962 | Keithan ............................ 137/527 X |
| 3,191,619 | 6/1965 | Allen .................................. 137/527 X |

*Primary Examiner*—Harold W. Weakley
*Attorney, Agent, or Firm*—Eugene N. Riddle

[57] ABSTRACT

A clapper-type check valve has a valve body with a chamber therein and a clapper-type valve member is mounted on an arm pivotally supported in the valve chamber. The valve member is supported from the lower end of the arm about a support pin received in openings in a pair of spaced lugs on the rear face of the valve member. An elastomeric bushing fits within each of the lug openings around the pin to permit a dampened and limited relative movement between the arm and the valve member. A channel-shaped strap is secured to the rear face of the valve member and receives a mid-portion of the arm. A band of elastomeric material is bonded around the arm between the valve member and the strap to permit a dampened and limited relative movement between the arm and the valve member.

7 Claims, 4 Drawing Figures

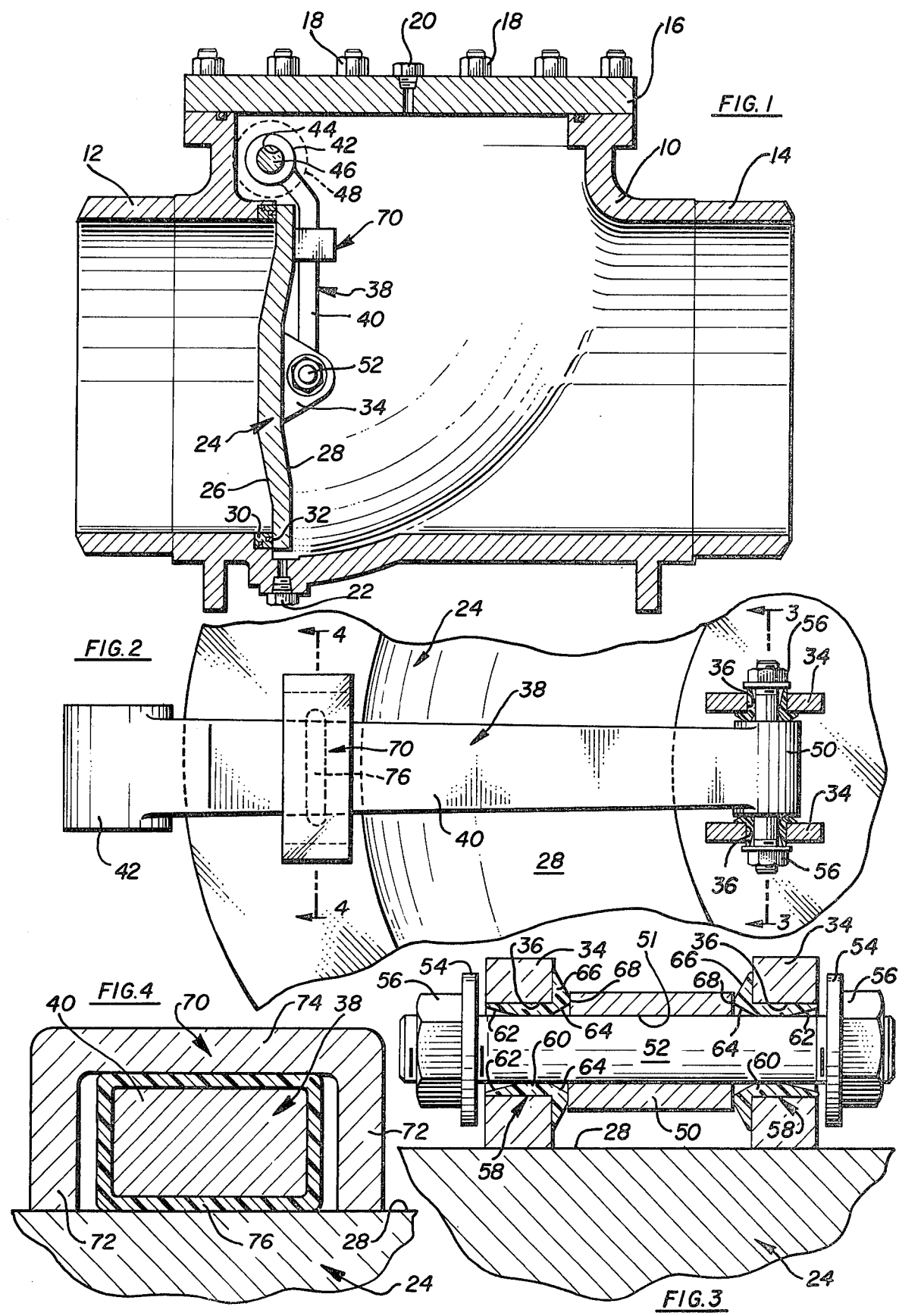

DAMPENING MEANS FOR SWING CHECK VALVE

BACKGROUND OF THE INVENTION

This invention relates to a swing check valve mounted in a valve chamber for pivotal movement between open and closed positions.

Heretofore, a clapper-type swing check valve member which swings freely from a closed position has been supported by an arm with a loose fit between the arm and the clapper valve member so that the valve member may freely seat on the face of the adjacent seat in a closed position. In addition, a restraining strap or loop on the rear face of the valve member in which the arm fits has permitted movement of the arm. Turbulence in the flow of fluid through the check valve causes the clapper valve member to oscillate or vibrate to the limit of the clearances provided in the pin connection of the arm to the valve member and in the strap to cause impacting of the arm against the strap and also against the pin which results in a fatigue failure in some instances unless overly designed parts are provided for the strap and the pin connection. Repeated impacts of the arm against the restraining strap tends to effect a failure of the strap unless an unusually heavy cross-section of the strap is provided and also unless an unusually strong connection is provided between the strap and the back face of the check valve member on which the strap is secured.

Prior art arrangements have not been successful in providing an effective arrangement to minimize the fatigue exerted by the check valve member continually seeking its seated position and repeatedly floating back and forth from seated to unseated position resulting in a continual movement of the arm against the strap and the pin connection of the arm.

DESCRIPTION OF THE INVENTION

The present invention is directed to a swing check valve structure in which the arm supporting a clapper-type disc-shaped valve member is connected to the valve member through a pin connection forming a pivot and a restraining strap is mounted on the back face of the valve member to receive the arm. The mountings of the arm at the pin connection and at the strap are provided with means to dampen the oscillating and vibration movements of the valve member when it is open or in partially open position, thus reducing the fatigue of the arm and its associated structure. The invention specifically provides for dampening means, such as rubber or other soft elastomers to be positioned between the arm and the valve member so that shock loads and impacts will be absorbed and dissipated by the elastomeric material. The reduced shock and impact loads transmitted from the valve member to the arm increases the life of the connection of the arm to the valve member and also the restraining strap. Specifically, elastomeric material is bonded to the arm to fill the space between the arm and the adjacent restraining strap. In addition, elastomeric sleeves or bushings are positioned around the pin on each side of the arm receiving the pin so that relative movement between the arm and the pin axially of the pin is cushioned and any clearance is filled by the elastomeric material.

Various other objects, advantages, and features of this invention will become apparent to those skilled in the art from the following discussion, taken in conjunction with the accompanying drawings, in which:

FIG. 1 is a longitudinal sectional view of the clapper-type check valve structure having the dampening and cushioning means embodying the present invention incorporated therein;

FIG. 2 is a plan view of the arm and clapper-type valve member removed from the valve body;

FIG. 3 is an enlarged section taken generally along line 3—3 of FIG. 2; and

FIG. 4 is a enlarged section taken generally along line 4—4 of FIG. 2.

Referring now to the drawings for a better understanding of the invention, a swing check valve structure is shown in FIG. 1 comprising a valve body 10 with entrance and exit pipe sections 12 and 14 respectively welded to the ends of body 10. A bonnet 16 is secured over body 10 and connected thereto by suitable nut and stud combinations shown generally at 18. A plug 20 closes a vent opening for body 10 and a plug 22 closes a bottom drain opening.

A disc-shaped clapper-type valve member mounted within a valve chamber formed by body 10 is shown generally at 24 and has a front face 26 and a rear face 28. A seat ring 30 having a face seal 32 therein is adapted to engage in sealing contact the front face 26 of swing check valve member 24. Seat ring 30 fits in an annular groove in body 10.

Secured to the central portion of back face 28 are a pair of spaced lugs 34 having openings 36 therein. Supporting swing check valve member 24 is an arm generally indicated at 38 and being of a rectangular cross-section. Arm 38 includes a main body 40 of an elongate rectangular cross-section having a hub 42 on an upper end thereof with an opening 44 therein receiving a shaft 46 on which hub 42 is fixed. Shaft 46 is supported adjacent its ends on body 10. Suitable drive means indicated at 48 are connected to an end of shaft 48 to drive or rotate shaft 46 and arm 38 secured thereto. The lower end of arm 38 has a lower hub or sleeve 50 thereon which fits between the pair of lugs 34. Hub 50 has an opening 51 receiving a pin 52 which fits within openings 36 of lugs 34. Washers 54 and nuts 56 on the ends of pin 52 secure pin 52 outwardly of lugs 34. Hub 50 is not secured to pin 52 but has a small clearance to permit relative rotational movement between pin 52 and arm 38.

Forming an important part of this invention is the dampening means positioned between hub 50 of arm 38 and lugs 34. The dampening means comprises a pair of elastomeric bushings or sleeves generally indicated at 58 fitting within openings 36 and around pin 52 as shown clearly in FIG. 3. Each elastomeric bushing 58 includes a main generally cylindrical body 60 having inner tapered ends 62 and 64. An annular flange 66 extends around body 60 adjacent tapered end 64 and engages the inner surface of the associated lug 34. Flange 66 has an extending lip or protuberance 68 which engages the adjacent side of hub 50. Lip 68 aids in centering hub 50 between lugs 34 and provides an increasing resistance to lateral movement of hub 50. Elastomeric bushings or sleeves 58 fill the space created between lugs 34 and hub 50, in addition to filling the clearance or tolerance between pin 52 and lugs 34. This minimizes the impact and shock loads transmitted between lugs 34 and pin 52.

A channel-shaped metal strap generally indicated at 70 is secured to rear face 28 of valve member 24 adjacent an upper end portion thereof. Strap 70 has sides 72 and arm 38 fits between sides 72 and strap 70. sides 72 are preferably welded to rear face 28. The portion of arm 38 that fits within strap 70 has an elastomeric material shown at 76 bonded thereto. Elastomeric material 76 forms a relatively narrow band around arm 38 as shown in FIG. 3 and may be, for example, ⅛ inch in width while strap 70 is of a substantially greater width.

The employment of elastomeric or resilient bushings 58 and elastomeric band 76 about arm 38 provide cushioning which absorbs and dissipates shock and impact loads exerted against clapper valve member 24. This also reduces the loads transmitted through arm 38 to shaft 46 and increases the life of shaft 46.

What is claimed is:

1. In a check valve having a valve body with a valve chamber therein and flow passageways therethrough connected to said valve chamber, a clapper-type disc-shaped valve member, an elongate arm pivotally supporting said valve member and being mounted within said valve body to swing freely between open and closed positions of the valve member, an improvement in said check valve comprising:
    (a) support means secured to the back face of said disc-shaped valve member having an opening therethrough, said arm having a hub on the upper and lower ends thereof, a support pin received within the lower hub and extending through the opening in said support means, bushing around the pin and fitting within the opening; and
    (b) a generally channel-shaped strap secured to the rear face of the valve member and extending about a mid-portion of said arm to restrain pivotal movement between the arm and valve member, and resilient dampening means extending around the arm at a position between the arm and the strap to limit relative movement between the strap and said arm and to absorb forces being transmitted between the arm and valve member.

2. The check valve as set forth in claim 1 wherein said resilient dampening means comprises a narrow band of elastomeric material bonded to the arm about its entire circumference.

3. The check valve as set forth in claim 1 wherein said support means further includes a pair of spaced lugs secured to said valve member and having openings to receive said support pin, and an elastomeric bushing around the pin at each lug opening to dampen and vibrationally isolate movement of said valve member relative to said arm.

4. In a check valve having a valve body with a valve chamber therein and flow passageways therethrough connected to said valve chamber, a clapper-type disc-shaped valve member, an elongate arm pivotally supporting said valve member and being mounted within said valve body to swing freely between open and closed positions of the valve member, an improvement in said check valve comprising:
    (a) a pair of spaced lugs secured to the back face of said disc-shaped valve member with each lug having an opening therethrough, said arm having a hub on the upper and lower ends thereof, a support pin received within the lower hub and extending through the openings in said lugs, elastomeric bushings around the pin and fitting within the openings;
    (b) a strap secured to the rear face of the valve member and extending about a mid-portion of said arm to restrain relative pivotal movement between the arm and valve member, and resilient dampening means extending around the arm at a position between the arm and the strap to limit relative movement between the strap and said arm and to absorb forces being transmitted between the arm and valve member.

5. The check valve of claim 4 wherein each elastomeric bushing has a generally cylindrical portion with an outwardly extending flange on one end thereof, said cylindrical portion being disposed between said pin and one of said openings and said flange being disposed between one side of said arm and the adjacent side of the associated lug.

6. The check valve of claim 5 wherein said flange of said elastomeric bushing has an extending lip engaging the adjacent side of the arm whereby displacement of said arm toward either of said lugs from a centrally disposed position between said lugs results in an increasing resistance to motion in that direction.

7. The check valve of claim 4 wherein said strap is channel-shaped with the ends thereof rigidly secured to the rear face of said valve member, said arm being of a generaly rectangular cross-section and fitting within the strap in spaced relation thereto, said resilient dampening means comprising a narrow band of elastomeric material bonded to the arm about its entire circumference.

* * * * *